(12) United States Patent
Yamada

(10) Patent No.: US 8,827,569 B2
(45) Date of Patent: Sep. 9, 2014

(54) CONNECTOR

(75) Inventor: Yoshihisa Yamada, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 233 days.

(21) Appl. No.: 13/069,486

(22) Filed: Mar. 23, 2011

(65) Prior Publication Data

US 2011/0235977 A1   Sep. 29, 2011

(30) Foreign Application Priority Data

Mar. 26, 2010   (JP) .................................. 2010-073012

(51) Int. Cl.
*G02B 6/38* (2006.01)
*H01R 24/84* (2011.01)

(52) U.S. Cl.
CPC ................ *G02B 6/383* (2013.01); *H01R 24/84* (2013.01)
USPC .......................................................... 385/56

(58) Field of Classification Search
CPC .................................. G02B 6/383; H01R 24/84
USPC ................ 385/53, 55, 58, 76, 77, 66, 84, 56; 439/253, 257, 577, 607.27, 689, 750, 439/765, 733.1, 625
See application file for complete search history.

(56) References Cited

U.S. PATENT DOCUMENTS

| | | | |
|---|---|---|---|
| 4,340,097 A * | 7/1982 | Ammann et al. ................ 141/98 |
| 4,405,201 A * | 9/1983 | Cefarelli et al. ................ 385/59 |
| 4,743,207 A * | 5/1988 | Clark ............................ 439/317 |
| 4,767,350 A | 8/1988 | Cooper et al. |
| 5,113,475 A * | 5/1992 | Baker ........................... 385/138 |
| 5,890,922 A * | 4/1999 | Buchter et al. ................ 439/284 |
| 5,984,721 A * | 11/1999 | Self et al. ....................... 439/546 |
| 6,428,354 B1 * | 8/2002 | Meyer et al. .................. 439/551 |
| 6,450,834 B1 | 9/2002 | Polgar et al. |
| 6,881,084 B2 * | 4/2005 | Crossan et al. ............... 439/292 |
| 7,325,596 B2 * | 2/2008 | Ebner .......................... 166/65.1 |
| 7,789,689 B2 * | 9/2010 | Frey et al. ..................... 439/275 |
| 2003/0013337 A1 * | 1/2003 | Crossan et al. ............... 439/284 |
| 2005/0032423 A1 | 2/2005 | Ward et al. |
| 2011/0235977 A1 * | 9/2011 | Yamada .......................... 385/76 |
| 2011/0237138 A1 * | 9/2011 | Yamada ..................... 439/733.1 |

FOREIGN PATENT DOCUMENTS

| | | |
|---|---|---|
| DE | 20 2007 007564 U1 | 7/2007 |
| GB | 2155703 A | 9/1985 |
| JP | 63-055872 | 3/1998 |
| WO | 98/11630 A1 | 3/1998 |

OTHER PUBLICATIONS

Extended European Search Report for European Patent Application 11002449.4, May 20, 2011, European Patent Office.

* cited by examiner

*Primary Examiner* — Charlie Peng
(74) *Attorney, Agent, or Firm* — Kubotera & Associates, LLC

(57) ABSTRACT

A connector is to be attached to a casing. The connector includes a cylindrical body; and a flange extending from the cylindrical body and to be attached to the casing. The flange includes at least one of a depressed section and a cut-out section so that the flange is overlapped with a mating flange at the depressed section or the cut-out section in a thickness direction of the flange.

8 Claims, 14 Drawing Sheets

CONNECTOR

BACKGROUND OF THE INVENTION AND RELATED ART STATEMENT

The present invention relates to a connector for electrical transmission and optical transmission. More specifically, the present invention relates to a connector to be attached to a casing with a flange.

In order to achieve reliability of electrical and optical connection, especially, vibration resistance of a connector, it is important to minimize loosening of fitting between connectors that are fit to each other. Therefore, for strong connection, in addition to fitting terminals together, cylindrical bodies of the connectors that hold the terminals may be connected with a screw, or a flange may be provided to a cylindrical body and is attached to a casing with a screw.

As an example of the connectors to be connected using a screw passing through a flange thereof, Patent Reference has disclosed a conventional connector.

Patent Reference: Japanese Patent Publication No. 63-055872

In the conventional connector disclosed in Patent Reference, a long cylindrical body holds a plurality of terminals via an insulator, and a flange of a sufficient thickness is disposed on an outer circumference thereof. The flange has a face projecting vertically in a connector fitting direction, so that the flange contacts with the casing through a gasket. Then, the flange is attached to the casing by putting a screw into a screw through hole formed in the flange and fastening with a nut.

Further, the conventional connector is connected to a mating connector by joining the flange thereof to a flange of the mating connector with a screw from the other side opposite to the side used for attachment to the casing. Therefore, upon connecting, a dimension of the connectors with the flanges corresponds to a total thickness of the flanges in the connector fitting direction.

In the conventional connector disclosed in Patent Reference, upon joining the flanges, the dimension of the connectors corresponds to the total thicknesses of the flanges. Accordingly, in order to secure a sufficient joining strength, it is necessary to provide the flanges with a large thickness. Further, when the flange is a flat face, the conventional connector tends to easily tilt, thereby making it difficult to stably connect the conventional connector to the mating connector.

In view of the problems described above, an object of the present invention is to provide a connector having a flange capable of solving the problem of the conventional connector. In the present invention, when the connector is connected to a mating connector, it is possible to obtain a sufficient joining strength while reducing a dimension of the connector. Accordingly, it is possible to stably connect the connector to the mating connector.

Further objects and advantages of the invention will be apparent from the following description of the invention.

SUMMARY OF THE INVENTION

In order to attain the objects described above, according to a first aspect of the invention, a connector has a cylindrical body with an outer circumferential face. A flange projects from the outer circumference face, so that the connector is attached to a casing at the flange with a screw.

According to the first aspect of the invention, it is possible to house at least partially the flange in a depressed section with a step portion or a cut-away section of a mating flange formed in one of regions divided in a circumferential direction of the mating flange. Further, after the connector is attached to the casing, a thickness range of the flanges is overlapped with a thickness range of the mating flange. The flange also has a screw through hole to attach the flange onto the casing.

According to the invention, at least a part of the flange of the connector is housed in the depressed section or in the cut-away section of the mating flange of the mating connector. Accordingly, there is an overlapped portion in the flange thickness direction between the flange of the connector and the mating flange. Accordingly, in comparison with a total thickness of two flanges of conventional connectors, it is possible to reduce a total dimension of the flanges in the thickness direction, thereby reducing a dimension of the connector in the thickness direction.

According to a second aspect of the invention, the flange preferably has a corresponding side face in relative to the mating flange, such that a side face respectively contacts with a face or be adjacent to a side face of the cut-away section of the mating flange. Accordingly, the corresponding side face contacts with the side face or faces the side face of the mating flange in a direction orthogonal to the direction of attaching the connector to the casing. As a result, it is possible to make the connector durable against an outer force in the contacting direction, thereby improving the attachment strength of the connector.

According to a third aspect of the invention, the flange may have a section to tightly hold the depressed face section of the mating flange with the casing. With the section, the flange holds the mating flange between the casing and the connector, thereby making it possible to enhance the attachment strength.

According to a fourth aspect of the invention, the flange preferably has an edge protruding towards the mating flange, so as to cover an end face of a corresponding edge of the mating flange. With the protruding edge, the flange can have an improved strength. Further, the flange tightly holds the mating flange. Accordingly, it is possible to enhance the attachment strength. When the flange is made of metal, it is possible to improve a shielding effect.

According to a fifth aspect of the invention, the flange may be formed only at a position corresponding to the depressed section or the cut-away section of the mating flange. With the configuration, the flange is not situated other than the depressed section, so that it is possible to minimize the total thickness of the flanges.

According to a sixth aspect of the invention, the flange has a plurality of screw through holes, and the screw through hole may be preferably formed at equal distances from the outer circumferential face of the connector. With the configuration, it is possible to reduce the size of the connector even in the radial direction.

According to the invention, as a mating connector, i.e., a connector to connect with the aforementioned connector, the connector may be configured to have a flange that projects from the outer circumferential face of the connector having a cylindrical outer face and to be attached to a casing with the flange using a screw. In this case, the flange may have different thicknesses so as to have a depressed face section or to have cut-away sections in part around a cylindrical body of the connector, and can house in the thickness direction at least a part of the mating flange having screw through holes. In addition, once the connector is attached to the casing, there is an overlap in the flange thickness direction between the flange and the mating flange, and the screw through holes are formed therein.

According to the invention, the screw through hole of the flange and the screw through hole of the mating flange are preferably formed at the same distance from the outer circumferential face of the connector. With the configuration, it is possible to reduce the size of the connector in the radial direction.

According to the invention, the flange is preferably configured to join to the mating flange so as to form a generally even flat surface after joining to the mating flange. With the configuration, it is possible to maximize the strength while minimizing the thickness of the whole flange of the two connectors in the flange's thickness direction.

As described above, according to the invention, since the flange provided on the outer circumferential face of the connector is configured to house at least a part of the mating flange in the flange thickness direction in the depressed face section or in the cut-away section, which is formed to have a depressed face section or to have cut-away sections in part around a cylindrical body of the connector, and to have an overlap in the thickness direction between the flange and the mating flange, it is possible to reduce the total thickness of the flanges upon attaching the flanges onto the casing and thereby it is possible to reduce the size of the connector.

BRIEF DESCRIPTION OF THE DRAWINGS

FIGS. 8(a) and 8(B) are perspective views showing a terminal of the first connector according to the first embodiment of the invention, wherein FIG. 8(A) is a perspective view showing the terminal, and FIG. 8(B) is a perspective view showing a contact of the terminal;

FIGS. 9(A) to 9(C) are sectional views showing the terminal according to the first embodiment of the invention, wherein FIG. 9(A) is a sectional view showing the terminal, FIG. 9(B) is a sectional view showing a modified example of the terminal, and FIG. 9(C) is a sectional view showing another modified example of the terminal;

FIGS. 10(A) and 10(B) are views showing a cylindrical body of the second connector according to the first embodiment of the invention, wherein FIG. 10(A) is a partial sectional perspective view showing the cylindrical body of the second connector, and 10(B) is a front view showing the cylindrical body of the second connector viewed from a rear side;

DETAILED DESCRIPTION OF THE PREFERRED EMBODIMENTS

Hereunder, embodiments of the present invention will be described with reference to the accompanying drawings.

First Embodiment

Figure 1:
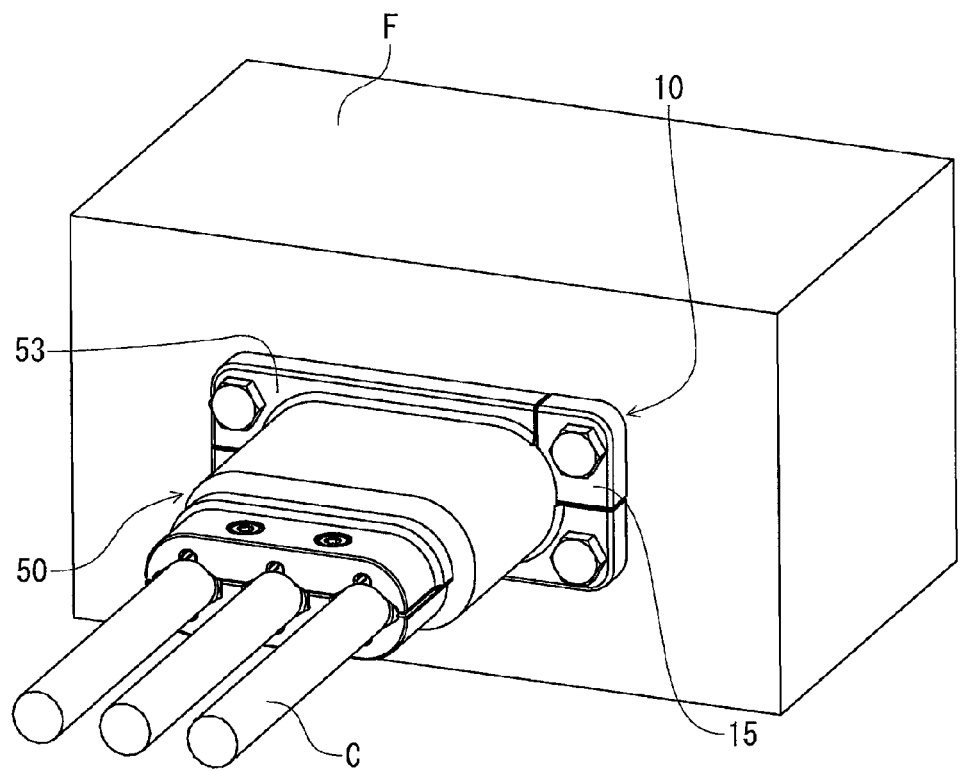
FIG. 1 is a perspective view showing a first connector and a second connector attached to a casing in a joining state according to a first embodiment of the invention.

A first embodiment of the present invention will be explained. FIG. 1 shows two connectors of the first embodiment, that is, a first connector 10 and a second connector 50 as a mating connector in a connecting state thereof. In FIG. 1, after connecting the second connector 50 to the first connector 10 that is attached to a casing F, the connectors 10 and 50 are attached to the casing F.

Figure 2:
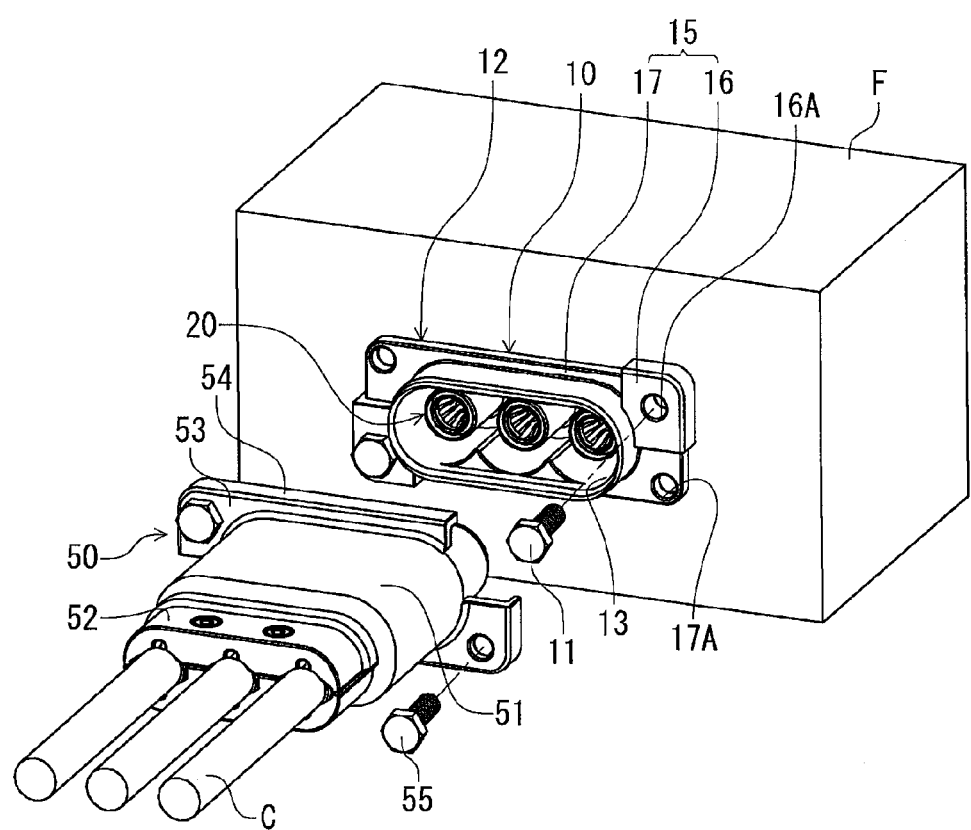
FIG. 2 is a perspective view showing the first connector and the second connector before the first connector is connected to the second connector according to the first embodiment of the invention.
Figure 3:
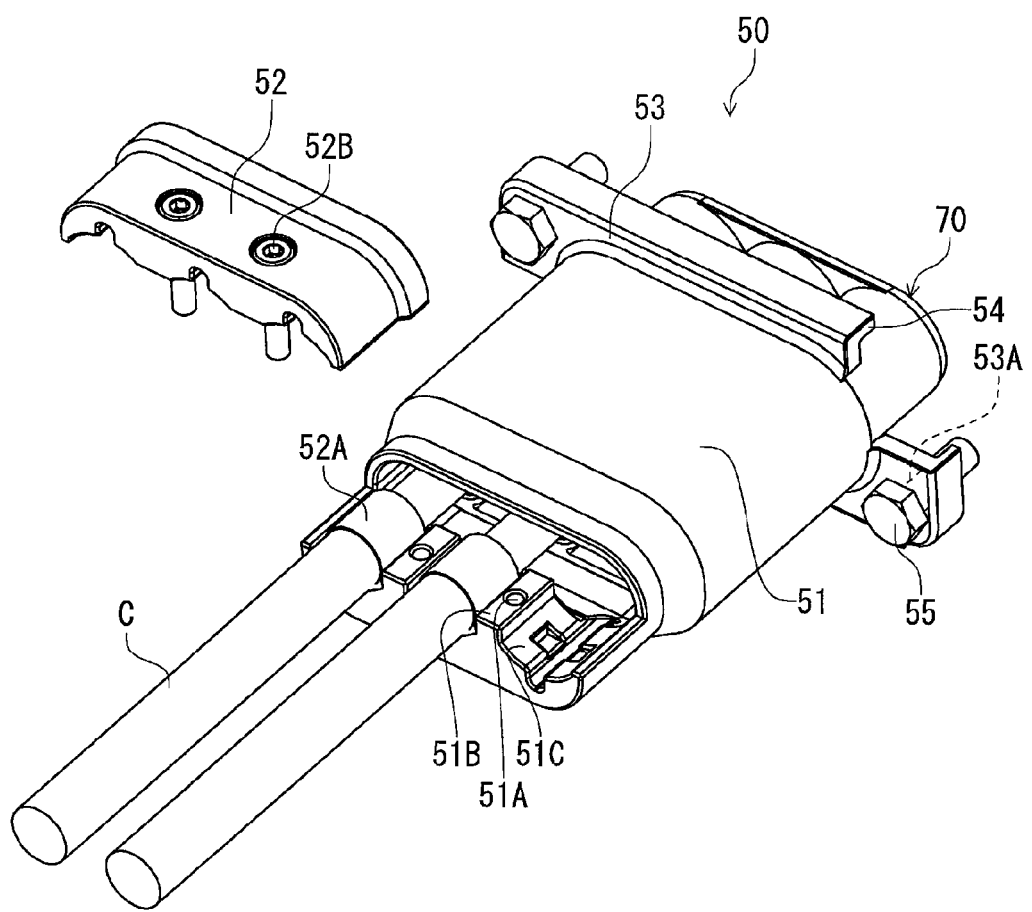
FIG. 3 is a partially exploded perspective view showing the second connector according to the first embodiment of the invention.
Figure 4:
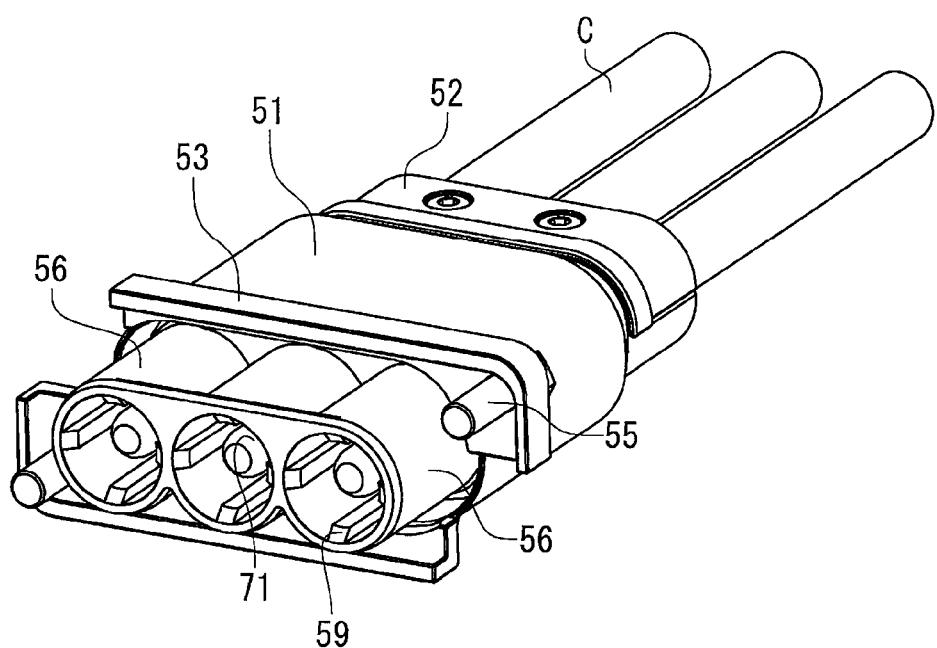
FIG. 4 is a perspective view showing the second connector viewed from an opposite side of FIG. 2 according to the first embodiment of the invention.
Figure 5:
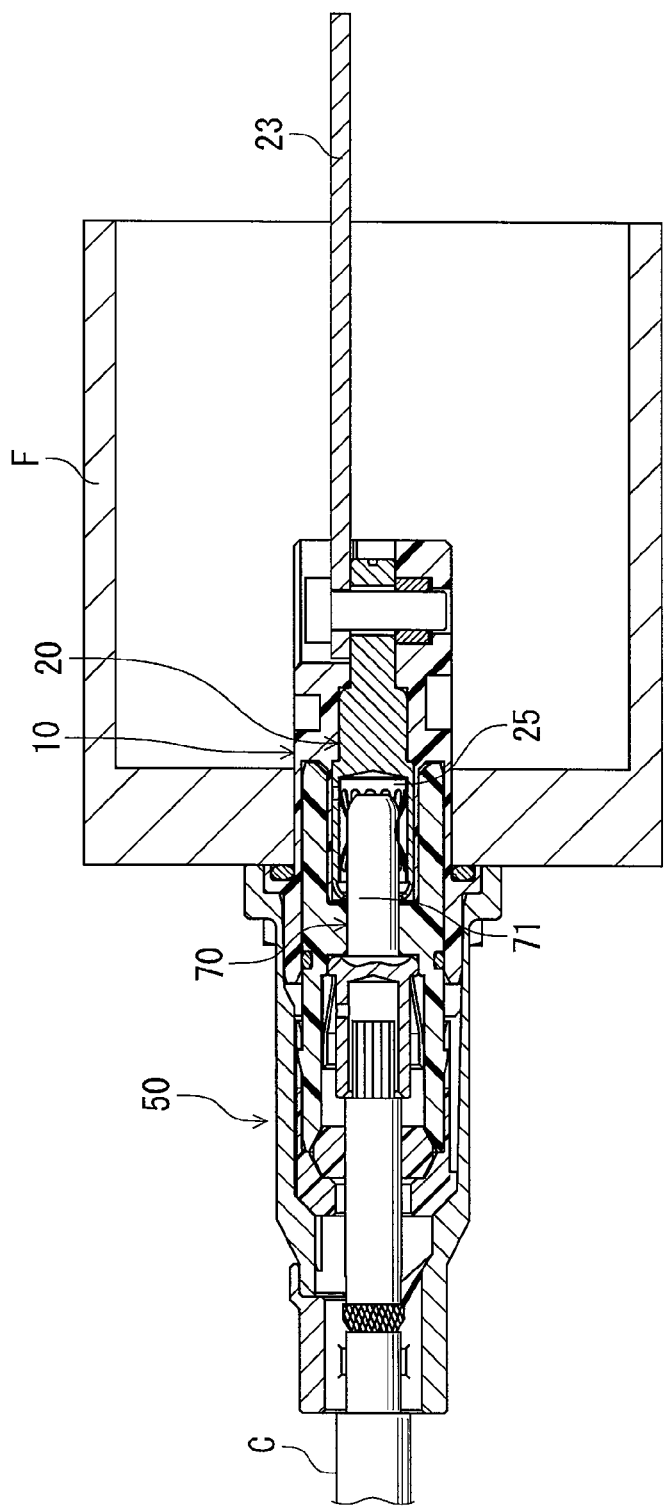
FIG. 5 is a longitudinal sectional view showing the first connector and the second connector according to the first embodiment of the invention.
Figure 6:
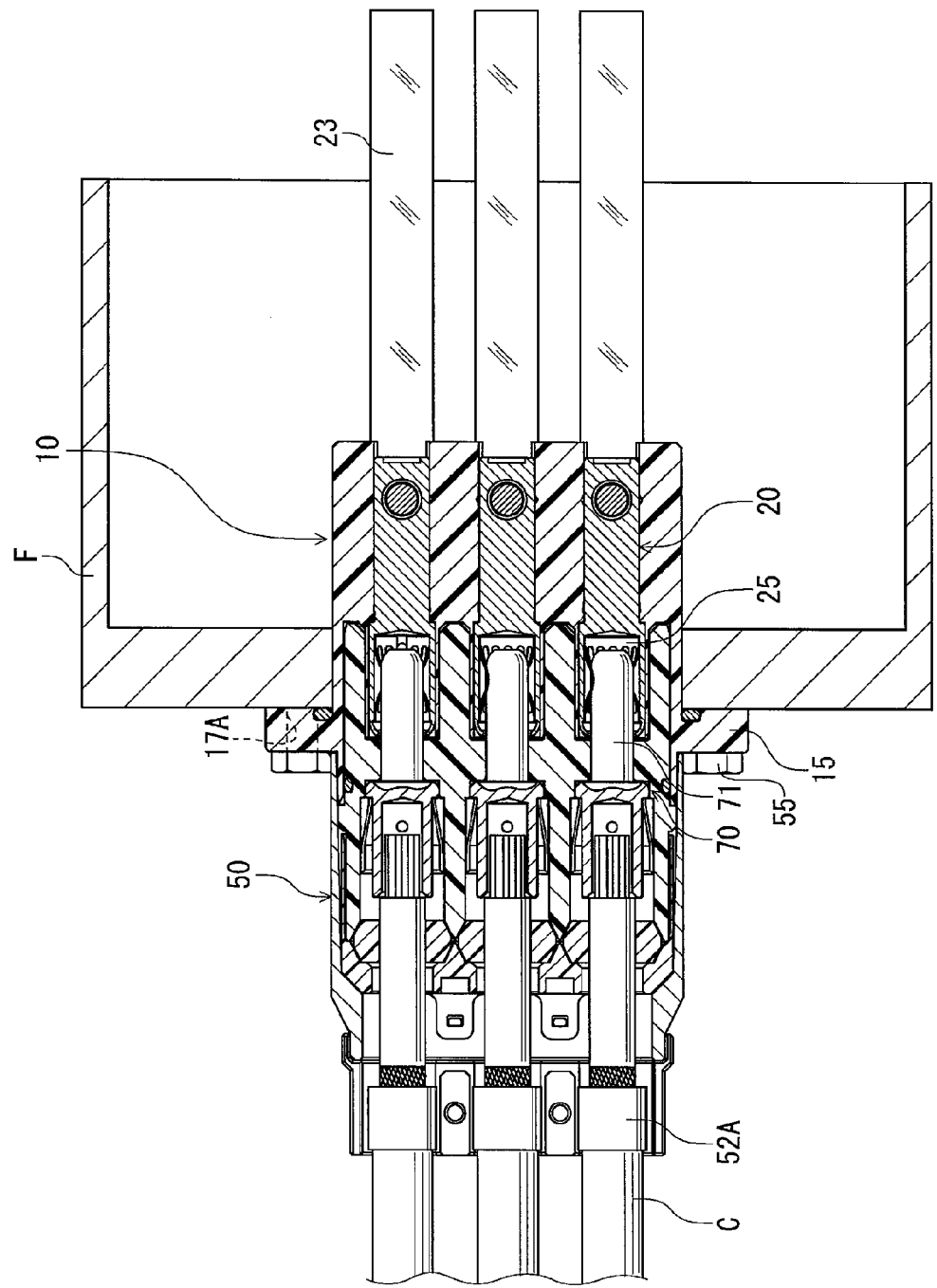
FIG. 6 is a lateral sectional view showing the first connector and the second connector viewed from below according to the first embodiment of the invention.
Figure 7:
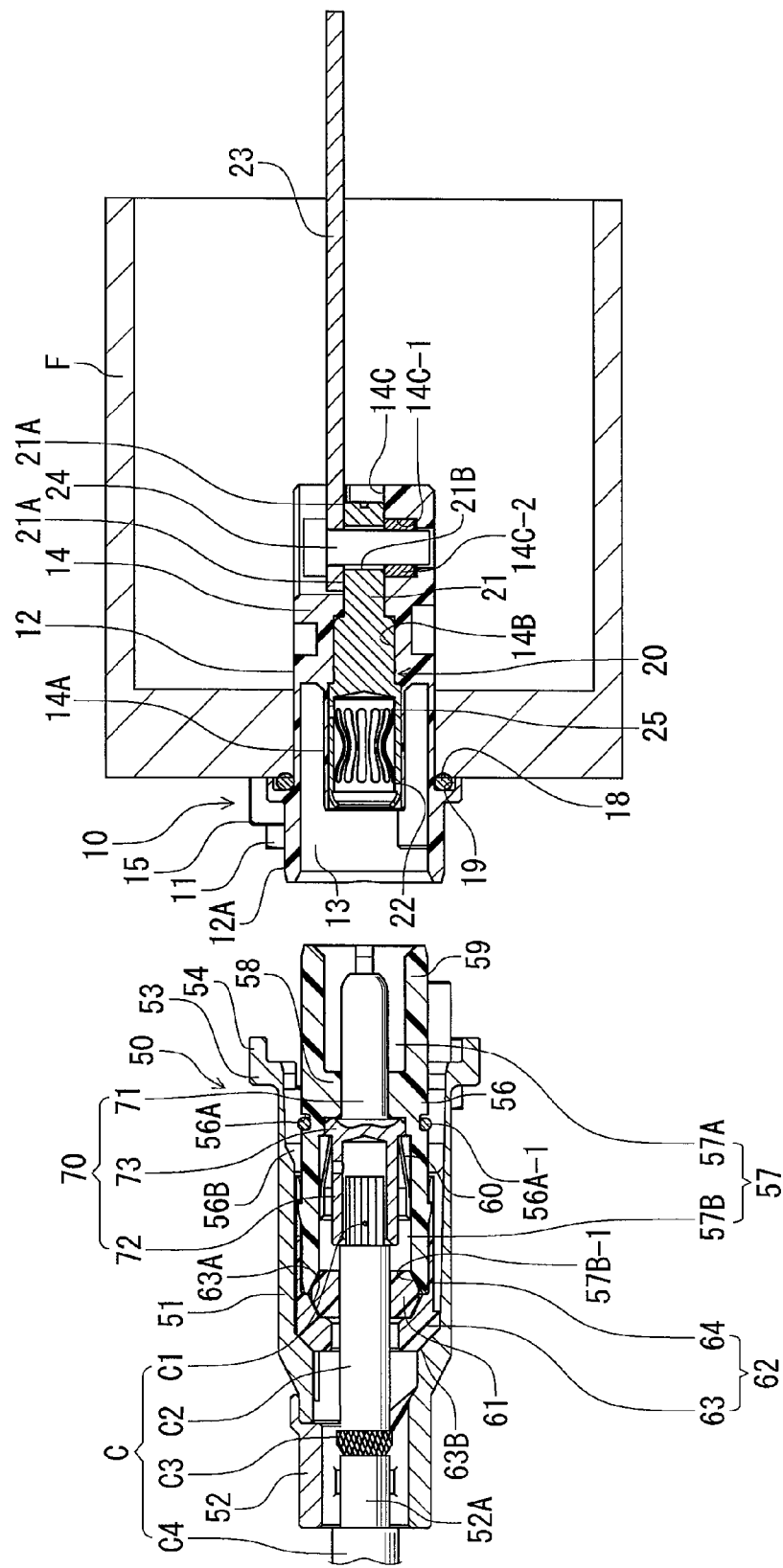
FIG. 7 is a longitudinal sectional view showing the first connector and the second connector before the first connector is connected to the second connector according to the first embodiment of the invention.

FIG. 2 shows a state before connecting the second connector 50 to the first connector 10. FIG. 3 is a partially exploded view of the second connector 50. FIG. 4 is a view of the second connector 50 viewed from a side opposite to that of FIG. 2. FIGS. 5 and 6 respectively show a longitudinal sectional view and a lateral sectional view of the connectors 10 and 50 shown in FIG. 1. FIG. 7 shows the connectors 10 and 50 shown in FIG. 5 before connecting to each other.

As shown in FIGS. 2 and 7, the first connector 10 is attached to the casing F with screws 11. The first connector 10 has a cylindrical section 12A, which has a laterally oblong section and extends in the connector fitting direction, integrally to an outer flange 15 of the housing 12. The housing 12 is made by molding synthetic resin, and has a receiving space 13 to receive the second connector 50 or the mating connector on a rear part thereof, i.e., a side of the second connector 50. The housing 12 has a terminal holding section 14 on a front part thereof. As also shown in FIG. 2, the housing 12 holds three terminals arranged thereon, and has three cylindrical receiving spaces 13 that are formed to connect to each other. Corresponding to the cylindrical receiving spaces 13, the housing 12 also has three terminal holding sections 14 (see FIG. 6).

As shown in FIG. 7, the thin sleeve 14A extends backward into the receiving space 13 from the terminal holding section 14 and serves for further securely holding the terminals, which will be described later. Each of the terminal holding sections 14 has a through space 14B, which is to press the terminals therein and connects to the inner space of the sleeve 14A.

In the embodiment, the through space 14B has a step-like cross-section and is narrow at the front part. The terminal holding section 14 has a front upper section cut away in front of the through space 14B so as to form a support section 14C.

The support section 14C has a hole 14C-1 that is provided through in the vertical direction so as to put a nut 14C-2 therein.

In the embodiment, the housing 12 has a flange 15 on an outer circumferential face of a cylindrical section 12A of the housing 12, and has the receiving space 13 formed therein. The flange 15 is formed over the whole circumference of the oblong cylindrical section 12A, and as shown in FIG. 2, has a generally rectangular shape.

In the embodiment, the flange 15 has on a rear side two protruding face sections 16 that are diagonal to each other, and depressed face sections 17, which are provided as areas other than the protruding face sections and are depressed in relative to the protruding face sections 16. On the front side that faces the casing F, the protruding face sections 16 and the depressed face sections 17 connect to each other in the circumferential direction without forming an uneven surface.

In the embodiment, each of the protruding face section 16 is formed to have an outer edge projecting slightly more than the outer circumferential edge of the depressed face sections 17. Accordingly, the outer circumferential face of the flange 15 is a step-like uneven face. The flange 15 has a circumferential groove section 19 that is continuously formed in the circumferential direction for seal ring 18. In addition, the flange 15 has screw through holes 16A and 17A at the corner sections on the protruding face section 16 and the depressed face section 17, respectively. The screw through holes 16A and 17A are formed at the same distance from the outer circumferential face of the cylindrical section 12A. The screw through holes 17A are provided so as to correspond to the screw through holes 53A of a flange 53 of the second connector 50, which will be described later.

Figure 8A:
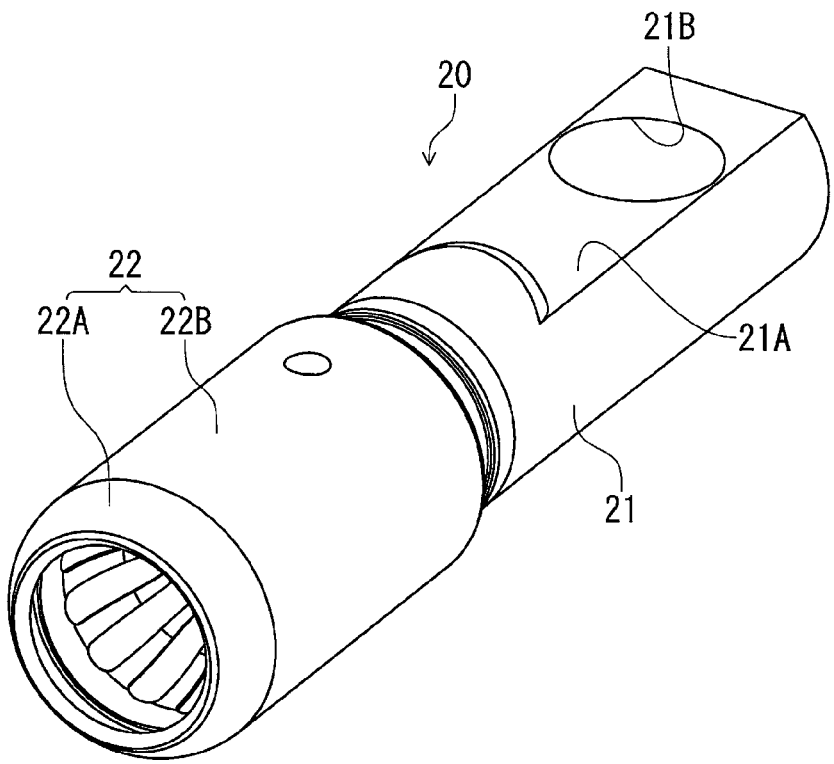
Figure 9A:
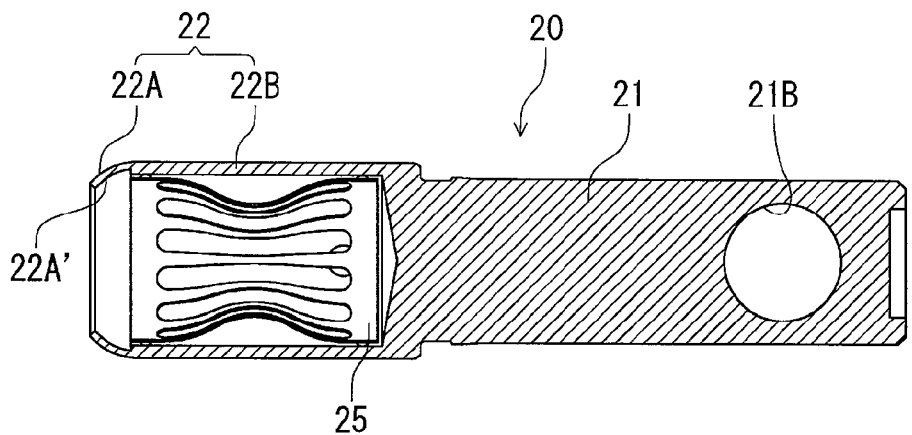

As shown in FIGS. 8(A) and 9(A), each of first terminals 20, which is held by the housing 12 of the first connector 10 and is made of metal, has a connecting section 21 that is provided as a kind of solid straight piece at the front part and a contact section 22 that has a cylindrical shape at the rear part. Each of connecting sections 21 has flat faces 21A that are formed by chamfering the top and bottom part and has a hole 21B that is provided vertically therethrough. The hole 21B houses a screw 24 (see FIG. 7) to connect and hold a terminal bar 23 by fastening with the screw 24 and a nut 14C-2.

As shown in FIG. 9(A), each of contact sections 22, which is a cylindrical section formed at the rear part, has a thin section 22A at an opening edge of the rear end. The thin section 22A is made thinner than other portion having an inner cylindrical face as a step-like uneven face. Furthermore, the diameter is changed at the border between the step-like section and the other portion, so as to have smaller diameter by swaging, i.e., bending, inward and form a latching section 22A'.

In the embodiment, the contact section 22 houses a contact 25 within the cylindrical section 22B, which is the other portion provided in front of the thin section 22A. The thin section 22A that forms the latching section 22A' does not have to be bent over the whole circumferential direction, and may be formed partially in the circumferential direction. Accordingly, the thin section 22A may not have to be formed over the whole area in the circumferential direction, and may be formed in part in the circumferential direction.

Figure 9B:
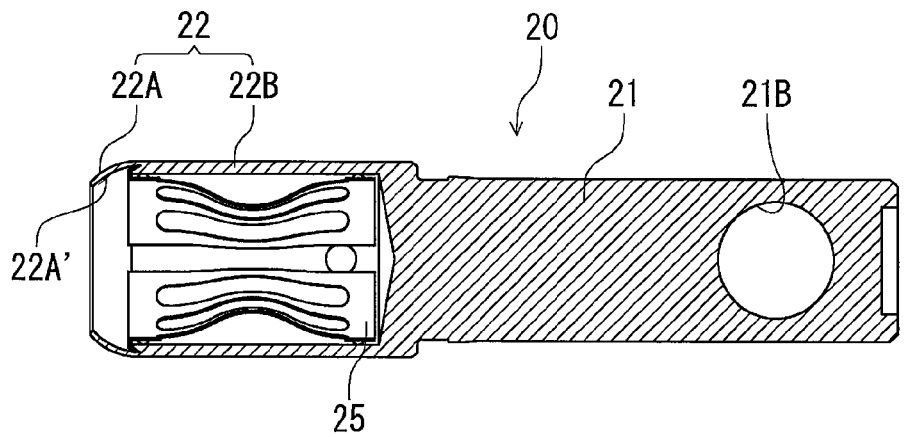
Figure 9C:
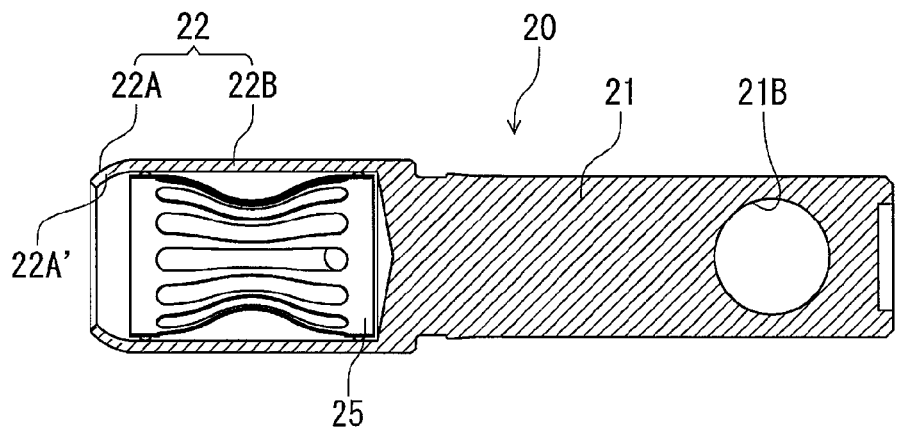

Instead of forming the step-like section on a face orthogonal to the stem as shown in FIG. 9(A), the thin section 22A of the contact section 22 may be formed as a step-like section on a slanted face so as to form a slanted groove as shown in FIG. 9(B). In addition, the thin section 22A may be also formed so as not to form a step-like section but to have smaller thickness as it goes to the open end of the rear end as shown in 9(C). As such, the latching section 22A' formed by the bent thin section 22A restricts displacement of the contact 25 in the axial direction, which will be described below.

Figure 8B:
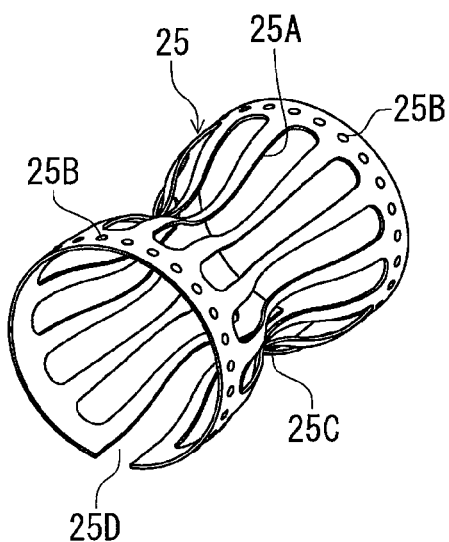

As shown in FIG. 8(B), each of the contacts 25 housed in the contact section 22 is made by rolling thin sheet metal into a cylindrical shape. In the contact 25, first, grooves 25A that extend in the front-and-back direction are formed on sheet metal, and then, dot-like dimples 25B are formed at the annular parts, which are the front and rear ends of the contact 25. Thereafter, rolling the sheet metal, the middle portion is made to have smaller diameter in the front-and-back direction so as to have an hourglass shape having a waist section 25C on an inner face.

Accordingly, the front and rear ends of the contact 25 having the grooves 25A formed thereon are housed in the cylindrical section 22B so as to almost contact with the inner face of the cylindrical section 22B of the first terminal 20. Further, the contact 25 has a slit 25D formed on one section in the circumferential direction and has the aforementioned waist section 25C. Accordingly, when pressure is applied outward in the radial direction onto the waist section 25C, the contact 25 elastically deforms to have a larger diameter.

At this time, as the diameter of the contact 25 becomes enlarged, the contact 25 becomes also elastically deforms in the front-and-back direction. A circumferential edge section on the rear end side of the annular section of each contact 25 may have a projection that projects in the radial direction and is bent in the diameter-enlarging direction (outer radial direction) so as to latch into the step-like section and slanted groove provided at the border between the thin section 22A and the cylindrical section 22B. Here, the grooves 25A may need to only extend somewhat along the axial direction and may be tilted in relative to the axis.

In the embodiment, the contact 25 may be made by forming the grooves and the waist section on a member that is thin and cylindrical. As shown in FIG. 2, the first connector 10 may be attached to the casing F with screws 11.

Furthermore, the second connector 50 has an outer cylindrical body 51 made of metal as shown in FIGS. 2 and 3, and the outer cylindrical body 51 has an upper part of the rear part (left part in the figure) of the outer cylindrical body 51 so as to be able to attach the pressing member 52 thereto. The outer cylindrical body 51 has a flange 53 on the front part. The flange 53 is provided only in area that corresponding to the depressed face sections 17, i.e., not to the protruding face section 16, in the circumferential direction of the flange 15 of the first connector 10.

In the embodiment, the flange 53 is configured such that the rear face and the outer circumferential face of the flange 53 form generally even flat surfaces with the rear face of the protruding face section 16 of the flange 15 and the outer circumferential face, respectively, upon contacting by face to the depressed face section 17 of the flange 15 of the first connector 10.

In other words, the thickness of the flange 53 (dimension in the front-and-back direction) is set equal to the protruding length of the protruding face section 16 from the depressed face section 17, and the flange 53 has a protruding edge 54 that forms a generally even flat face with the outer circumferential face of the protruding face section 16 at the inner circumferential face, by contacting with the outer circumferential face of each depressed face section 17.

In the embodiment, the flange 53 has screw through holes 53A so as to correspond to the mating screw through holes 17A formed on the depressed face sections 17 of the flange 15. Putting the screws 55 into the screw through holes 17A and 53A so as to screw into the casing F, the flange 53 tightly holds the flange 15 with the casing F. Since the outer cylindrical body 51 is made of metal, it is possible to shield the whole connector after connection of the connectors. The screw through holes 17A and 53A and the aforementioned screw through holes 16A are preferably formed at same distance from the outer circumferential face of the connector.

As shown in FIGS. 3 and 4, three cables C, which are disposed on cylindrical mounting faces 51C formed on the outer cylindrical body 51, extend backward from the second connector 50 (only two of the three cables C are shown in FIG. 3), and a pressing member 52 is attached to a cut-away flat section on an upper part on the rear side of the outer cylindrical body 51. The cut-away portion of the outer cylindrical body 51 has receiving sections 51B provided between adjacent cables C.

After the pressing member 52 is disposed on the receiving sections 51B via sleeves 52A made of soft metal, when screws 52B are screwed into the screw holes 51A, the pressing member 52 presses the cables C. The sleeve 52A is attached onto shield wire C3 of the cable C, and can be grounded to the casing F with the flange 53 of the outer cylindrical body 51 and the screws 55 via the outer cylindrical body 51. It is possible to form the sleeves 52A with copper tape and wrap them with shield wire C3, but it is also possible to contact the shield wire C3 directly to the outer cylindrical body 51 without the sleeves.

As shown in FIG. 7, the outer cylindrical body 51 houses therein a cylindrical body 56 made of synthetic resin. The outer cylindrical body 51 is made as a common member for three cables C and three terminals, which respectively correspond to the cables and will be described later.

Figure 10A:
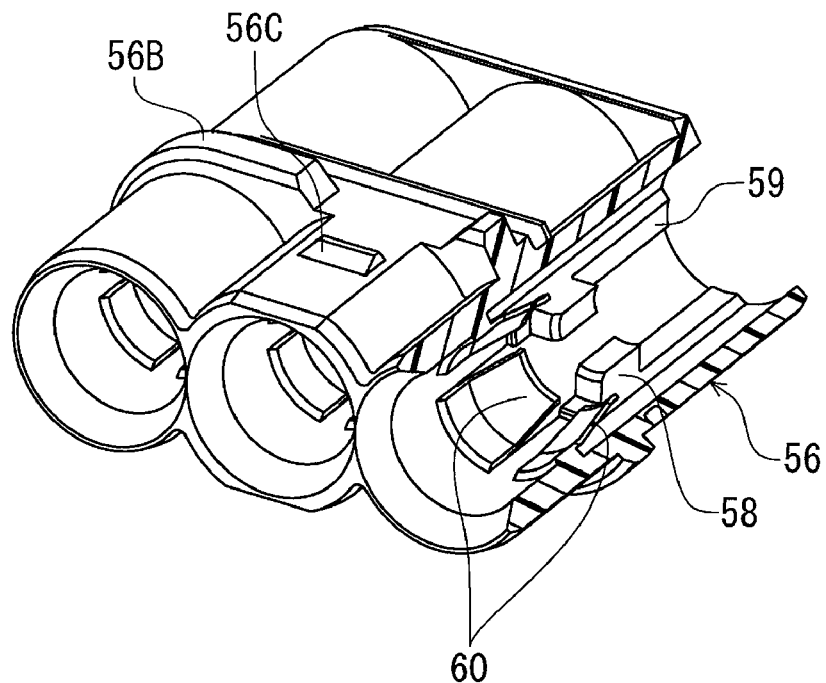
Figure 10B:
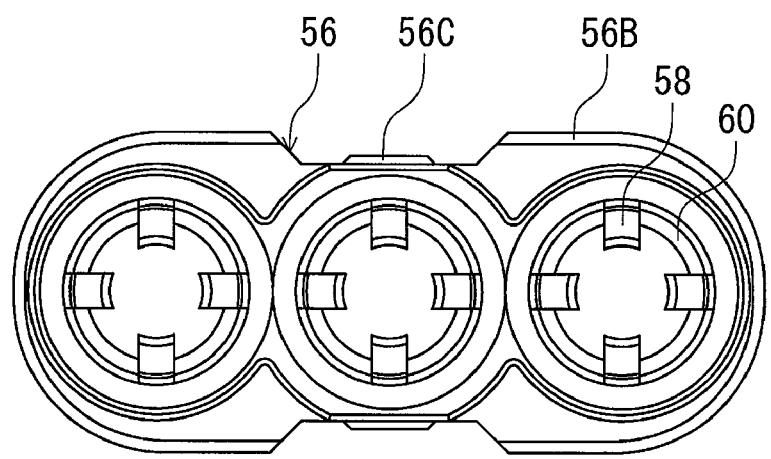

In addition, an independent terminal housing space 57 for the terminal, which is connected to the cable C and will be described later, is formed through in the front-and-back direction corresponding to the terminal. The cylindrical body 56 has latching protrusions 58, i.e. four latching protrusions as in FIG. 10 in the illustrated example, which protrude towards an inner face of the terminal housing space 57, at a plurality of positions in the circumferential direction.

In the embodiment, the latching protrusion 58 is provided in the middle of the cylindrical body 56 in the front-and-back direction, and divides the terminal housing space 57 into a front portion and a rear portion, and the front space 57A is space for a contact section of a terminal and the rear space 57B is space for a connecting section. The four latching protrusions 58 have their inner faces in the radial direction so as to form an arch on one circle.

As shown in FIG. 4, the above-described cylindrical body 56 has four protruding thin sections 59, which extend in the front-and-back direction in the front space 57A of the terminal housing space 57 in the circumferential direction. The protruding thin section 59 is provided at the same position as the latching protrusion 58. When the second connector 50 is connected to the first connector 10, protruding thin sections 59 enter between the cylindrical body 12A and the sleeve 14A of the first connector 10, and serve for supporting the second connector 50 and the first connector 10.

In the rear space 57B of the cylindrical body 56, there are four lances 60, which are integrally formed onto an inner face of the cylindrical body 56, and extend frontward from the inner face while tilting inward in the radial direction. The lances 60 are provided at position, which do not overlap with the latching protrusions 58 and the protruding thin sections 59 in the circumferential direction, i.e., at positions of the latching protrusions 58 that are adjacent to each other in the circumferential direction.

In the embodiment, the lance 60, which extends frontward while tilting inward in the radial direction, extends up to a position a certain distance away from the latching protrusion 58 in the circumferential direction, and has elasticity in the radial direction. The cylindrical body 56 has a seal ring groove 56A and contacting protrusion 56B at a middle position in the front-and-back direction on an outer circumferential face.

In the embodiment, the seal ring groove 56A houses a seal ring 56A-1 and contributes to sealing to the cylindrical body 12A of the first connector 10 upon connecting to the first connector 10. A front end of the contacting protrusion 56B contacts with a rear end of the cylindrical body 12A upon connecting to the first connector 10, and contributes to positioning of connection between the connectors 10 and 50.

As shown in FIG. 10, the contacting protrusion 56B is provided around the outer circumference of the cylindrical body 56 except where the center cable C is provided in case of the illustrated example, and on the part of outer circumferential face of the cylindrical body 56, where the contacting protrusion 56B is not provided, there is formed a latching protrusions 56C.

The cylindrical body 56 has tapered sections 57B-1 formed on an inner face of the rear end of the rear space 57B, so as to contact by face with a front part of the annular gasket 61 that is to be attached to the cable C.

As shown in FIG. 7, the cable C includes a core wire C1 composed of a plurality of wires, an inner jacket C2 that covers the core wire C1, and a shield wire mesh C3 that is provided on the inner jacket C2, a metal sleeve 52A that folds back the shield wire C3 and hold thereon, and an outer jacket C4, each of which is exposed towards the front end in the order.

In the embodiment, the gasket 61 has a cylindrical inner face that is to be attached to an outer face of the inner jacket C2, and a tapered outer face that is sloped to the front and rear sides, respectively. The tapered outer face on the front is provided to contact by face to the tapered face 57B-1 of the cylindrical body 56. The tapered outer face in the rear part of the gasket 61 is to contact with the pressing member 62 made of synthetic resin. The pressing member 62 has a thick rear section 63 and a sleeve-like thin front section 64.

In the embodiment, the thick rear section 63 has a tapered inner face 63A, which contacts with the tapered outer face in the rear part of the gasket 61 from the rear side, and a tapered outer face 63B that is to be pressed from the outer inner face of the outer cylindrical body 51, and the thin front section 64 extends frontward from the thick rear section 63. The thin front section 64 is configured to enter a gap between the outer cylindrical body 51 and the cylindrical body 56 from the rear side, and latch to the latching protrusion 56C at a window section that is not illustrated in the figure.

As shown in FIG. 7, the second terminal 70 of the second connector 50 has a pin-like contact section 71 formed on the front part, a wire connecting section 72 that is cylindrically formed on the rear part, and a section to be held 73 on an outer circumferential face in the middle part. The pin-like contact section 71 is made to have a diameter so as to enter the contact 25 of the first connector 10 and enlarge the waist section 25C of the contact 25.

In the embodiment, the wire connecting section 72 has an inner diameter that enables insertion of the core wire C1 of the cable C and is configured to crimp and connect the core wire C1. Furthermore, the section to be held 73 is formed as an annular protrusion, and the front face of the section to be held 73 contacts with a rear face of the latching protrusion 58 of the cylindrical body 56, and the rear face of the section to be held 73 is pushed forward and latched at the cylindrical body 56.

After disposing the gaskets 61 onto the inner jackets C2 of the cables C, the second terminals 70 are crimped to connect the core wires C1 thereto. Then, the second terminals 70 are inserted into the cylindrical bodies 56 from the rear side, and the contact sections 71 are pressed therein so as to contact with holding faces formed on inner faces of the four latching protrusions 58 to be hold in the radial direction and to be held with the latching protrusions 58 and the lances 60 in the cylindrical body 56 in the front-and-back direction.

Thereafter, the pressing member 62 is pressed with the gaskets 61 so as to latch with the cylindrical bodies 56, and place the sleeve 52A onto the mounting face 51C of the outer cylindrical body 51 so as to press the sleeves 52A on the shield wires C3, and then attach the pressing member 52 to the outer cylindrical body 51 with screws 52B.

In the embodiment, the four latching protrusions 58 with the contact sections 71 pressed therein receive pressure on the inner faces and deform in the radial direction to enlarge. Since, the volume difference by the deformation moves away towards the adjacent latching protrusions 58 in the circumferential direction, so that it is possible to securely pressing the contact sections 71 therein and thereby it is possible to prevent loosening of the fitting of the contact sections 71 therein.

As such, the second connector 50 formed by holding the terminals 70, to which the cables C are connected, with the latching protrusions 58 and the lances 60 in the cylindrical bodies 56 in the axial direction, and then holding the cylindrical bodies 56 with the outer cylindrical body 51 and the pressing member 52, is connected to the first connector 10, which is already attached to the casing F. The contact sections 71 of the second terminals 70 of the second connector 50 enter the contacts 25 of the first connector 10, and enlarge the diameters of the waist sections 25C of the contacts 25 so as to elastically connect thereto.

The contacts 25 of the first connector 10, which have enlarged diameters at the waist sections 25C elastically deform, i.e., elongate, also in the axial direction by the enlargement of the diameters. The contact 25 is restricted from the movements at one end on the second connector 50 side by the latching section 22A' of the first terminal 20, but the one end can displace by the elongation until it is restricted, and the other end can displace until it contacts with a bottom face of the cylindrical section 22B.

With the displacement, dimples 25B of the contacts 25 slide to contact with the contact sections 22 of the first terminals 20, which results in a cleaning effect and maintains satisfactory contacts. The thin section 22A of the contact 22 of the first terminal 20 has a step-like section having a slanted groove as shown in FIG. 9(B), and while tightly holding the projecting section, which is formed on a circumferential edge on one end side of the contact 25 and projects in the radial direction, with the slanted groove by bending the thin sections 22A, there is no displacement on the one end side, but the other end side may displace in the axial direction and thereby it is possible to obtain a cleaning effect.

The depressed face section 17 of the flange 15 of the second connector 10 houses the flange 53 of the second connector 50, and once the flange 53 is attached to the casing F with screws 55, the flange 53 of the second connector 50 and the flange 15 of the first connector 10 forms a generally even flat surface. Since the flange 53 of the second connector 50 contacts with a corresponding side face of the flange 15 of the first connector 10 at its side end edge, it is possible to enhance the holding strength with the flange 15 even in a direction orthogonal to the connector fitting direction.

Second Embodiment

A second embodiment of the present invention will be explained. The invention may be modified or altered in various ways other than the embodiments shown in FIGS. 1 through 10(A)-10(B).

Figure 11:
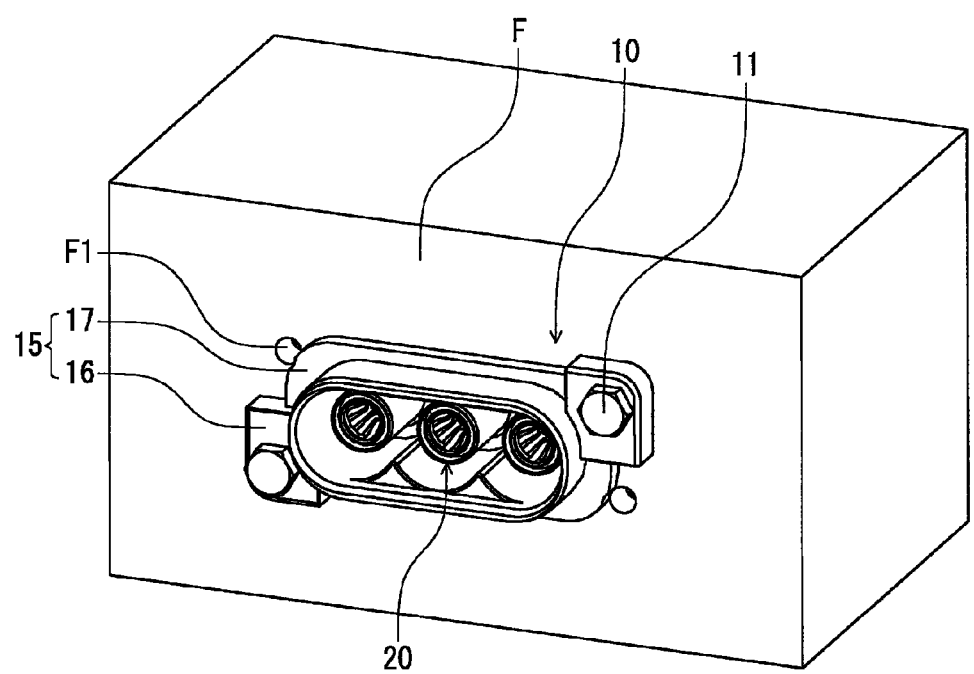
FIG. 11 is a perspective view showing the first connector attached to the casing according to a second embodiment of the invention.

In the embodiments of FIGS. 1 through 10(A)-10(B), the depressed face section 17 of the flange 15 of the first connector 10 has the screw through hole 17A formed thereon, whereas the depressed face section 17 according to the embodiment of FIG. 11 does not reach the position of the screw hole F1 of the casing F. Therefore, the flange 15 of the first connector 10 does not have a mating screw through hole formed thereon. Accordingly, the flange 53 of the second connector 50 is secured by directly screwing screws 55 into screw holes F1 of the casing F or by securing with nut from the back side. Even in this case, the flange 53 of the second connector 50 can tightly hold the flange 15 with the depressed face section 17.

Figure 12:
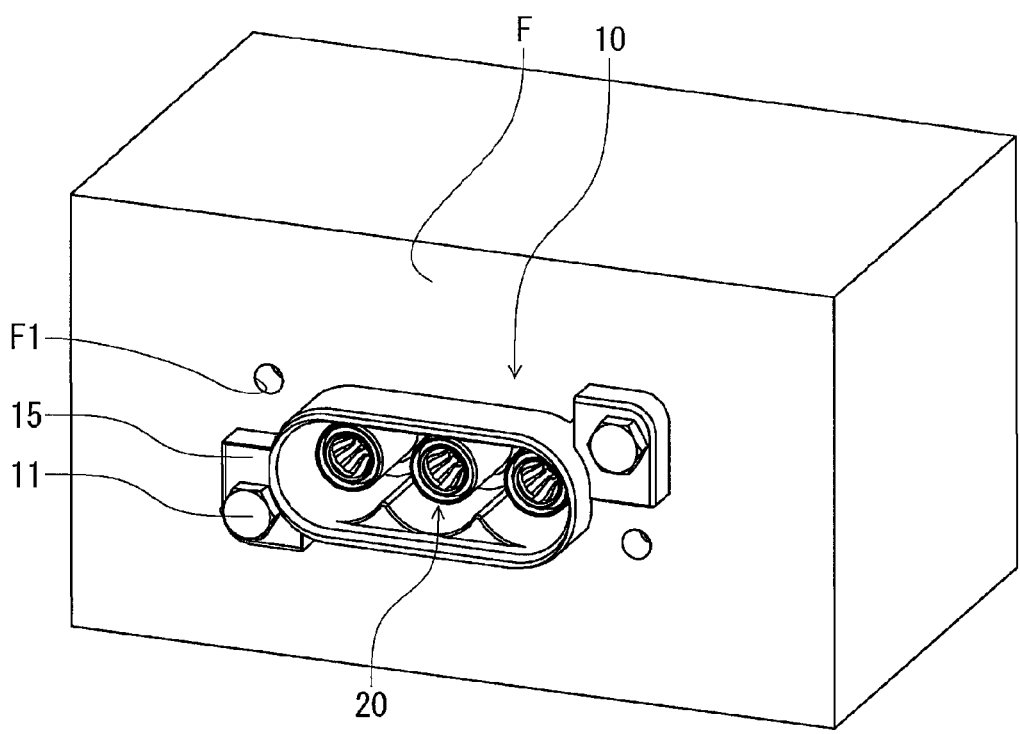
FIG. 12 is a perspective view showing a modified example of the first connector according to the second embodiment of the invention.

Furthermore, as shown in FIG. 12, the flange 15 of the first connector 10 has a cut-away section, which is formed by cutting away a part thereof, so as not to have a section that is equivalent to the depressed face section 17 in the embodiments of FIGS. 1 through 10. Accordingly, in the embodiment of FIG. 12, the flange 15 of the first connector 10 has only sections that are equivalent to the protruding face sections 16. Even in this case, similarly to the case of FIG. 11, the flange 53 of the second connector 50 is directly attached to the casing F with screws 55. However, since the first connector 10 does not have a section that is equivalent to the depressed face section 17, the flange 53 of the second connector 50 will not tightly hold the depressed face section 17.

Figure 13:
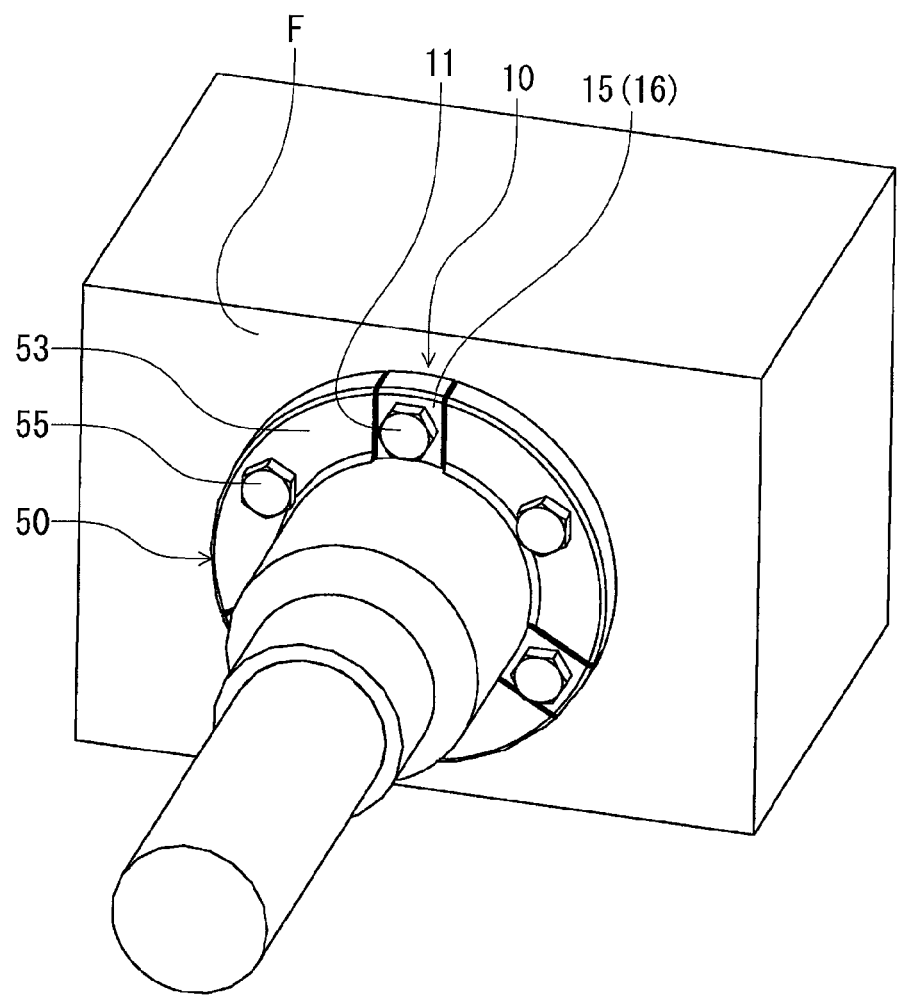
FIG. 13 is a perspective view showing another modified example of the first connector and the second connector in a state that the first connector and the second connector are attached to the casing according to the second embodiment of the invention.
Figure 14:
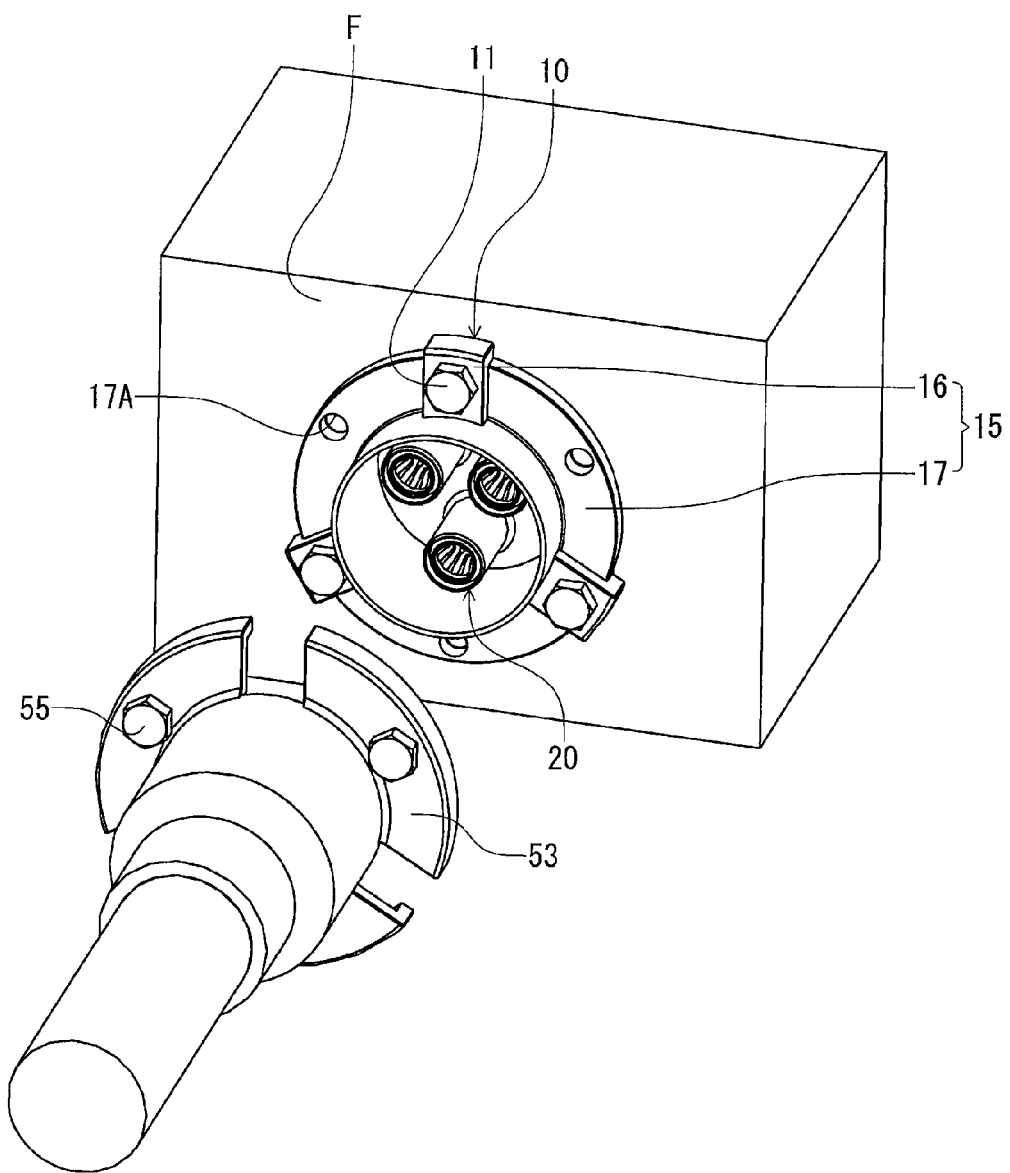
FIG. 14 is a perspective view showing the modified example of the first connector and the second connector shown in FIG. 13 before the first connector is connected to the second connector.

According to the invention, it is also possible to form the flange 15 of the first connector 10 and the flange 53 of the second connector 50 to have circular shapes. The embodiments of FIGS. 13 and 14 are examples, in which the circular cable C has three core wires and the core wire is individually connected to a terminal. In this case, since the terminals are arranged on a circumference of one circle, the connectors 10 and 50 have cylindrical outer shapes, and thereby the flanges 15 and 53 also have circular shapes.

As shown in FIG. 14 that illustrates the state before connection, the flanges 15 and 53 divide the annular areas into several areas along the circumferential direction, and the flange 15 has the protruding face section 16 and the depressed face section 17 and the flange 53 has the depressed face section 17 in corresponding areas.

In the embodiment, the connector is small in size, and the flange is cased with the mating flange in the casing and tightly holds the terminals. Therefore, the contacts provided on the terminals are made by spring members that can contact at larger area, so that it is possible to enhance the contact reliability of terminals at high current, achieve water-proof structure because of the gasket provided for the cable, and have a shielding structure, and thereby it is possible to achieve superior noise control effect.

The disclosure of Japanese Patent Application No. 2010-073012, filed on Mar. 26, 2010 is incorporated in the application by reference.

While the invention has been explained with reference to the specific embodiments of the invention, the explanation is illustrative and the invention is limited only by the appended claims.

What is claimed is:

1. A connector to be connected to a mating connector that is attached to a casing, comprising:
 a cylindrical body for receiving a mating cylindrical body of the mating connector in an axial direction thereof, said cylindrical body having an oval shape elongated in a direction perpendicular to the axial direction; and
 a flange extending from the cylindrical body outwardly in a radial direction of the cylindrical body,
 wherein said flange includes a cut-out section for accommodating a mating flange of the mating connector,
 said flange further includes a protruding edge protruding toward the mating flange at an edge thereof for covering a corresponding edge face of the mating flange, and
 said flange has a height from the casing substantially the same as that of the mating flange when the connector is attached to the mating connector so that the flange becomes substantially flush with the mating flange.

2. The connector according to claim 1, wherein said flange further includes a screw through hole for inserting a screw to attach the flange to the casing.

3. The connector according to claim 1, wherein said cutout section is situated in several regions divided along a circumferential direction of the flange.

4. The connector according to claim 1, wherein said flange further includes a side face contacting with or closely facing to a side face of the mating flange.

5. The connector according to claim 1, wherein said flange further includes a section for sandwiching a depressed section of the mating flange with the casing.

6. The connector according to claim 1, wherein said flange is situated only at a location corresponding to a depressed section or a cut-out section of the mating flange.

7. The connector according to claim 1, wherein said flange further includes a screw through hole for inserting a screw to attach the flange to the casing, said screw through hole being arranged at a plurality of locations away from the cylindrical body by an equal distance.

8. The connector according to claim 1, wherein said flange is integrated with the cylindrical body.

* * * * *